(12) United States Patent
O'Riordan

(10) Patent No.: US 7,693,048 B1
(45) Date of Patent: *Apr. 6, 2010

(54) ENHANCED INTERNAL ROUTER REDUNDANCY

(75) Inventor: Peter J. O'Riordan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 11/744,649

(22) Filed: May 4, 2007

Related U.S. Application Data

(63) Continuation of application No. 10/016,866, filed on Dec. 14, 2001, now Pat. No. 7,227,838.

(51) Int. Cl.
*H04L 12/26* (2006.01)

(52) U.S. Cl. .................. 370/219; 370/217; 370/220; 709/224

(58) Field of Classification Search .......... None
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,414,704 A | 5/1995 | Spinney |
| 5,473,599 A | 12/1995 | Li et al. |
| 5,488,412 A | 1/1996 | Majeti et al. |
| 5,506,987 A | 4/1996 | Abramson et al. |

(Continued)

FOREIGN PATENT DOCUMENTS

WO   WO98/31107   7/1998

OTHER PUBLICATIONS

T. Li, B. Cole, P. Morton, and D. Li, "Cisco Hot Standby Router Protocol (HSRP)," Mar. 1998, Network Working Group RFC 2281 (http://ftp.ietf.org/rfc/rfc2281.txt?number=2281).

(Continued)

*Primary Examiner*—Michael J Moore, Jr.
(74) *Attorney, Agent, or Firm*—Weaver Austin Villeneuve & Sampson LLP

(57) ABSTRACT

Disclosed are methods and apparatus for providing redundant data forwarding or routing capabilities. In one embodiment, a network device includes a designated router and a non-designated router. The designated router generally provides layer 3 switching or routing for data received into the network device. Although the non-designated router is active, it generally does not provide forwarding capabilities until the designated router fails. The non-designated router's logical interfaces are disabled, while the designated router's logical interfaces are enabled. The non-designated router becomes the new designated router when the first designated router fails. In general terms, the routers of the network device provide redundancy with the network being aware of only a single router within network device. That is, the network is only aware of a single router. This is accomplished by having the routers share the same IP and MAC address on each logical interface. The routers do not each also use a unique IP and MAC address in addition to the shared IP and MAC address, in contrast to conventionally configured routers of the hot standby router protocol (HSRP).

15 Claims, 8 Drawing Sheets

U.S. PATENT DOCUMENTS

| | | | |
|---|---|---|---|
| 5,572,528 | A | 11/1996 | Shuen |
| 5,586,121 | A | 12/1996 | Moura et al. |
| 5,619,552 | A | 4/1997 | Karppanen et al. |
| 5,729,537 | A | 3/1998 | Billstrom |
| RE35,774 | E | 4/1998 | Moura et al. |
| 5,793,763 | A | 8/1998 | Mayes et al. |
| 5,818,845 | A | 10/1998 | Moura et al. |
| 5,825,759 | A | 10/1998 | Liu |
| 5,828,655 | A | 10/1998 | Moura et al. |
| 5,859,852 | A | 1/1999 | Moura et al. |
| 5,862,345 | A | 1/1999 | Okanoue et al. |
| 5,862,451 | A | 1/1999 | Grau et al. |
| 5,872,773 | A | 2/1999 | Katzela et al. |
| 5,892,903 | A | 4/1999 | Klaus |
| 5,943,604 | A | 8/1999 | Chen et al. |
| 5,946,047 | A | 8/1999 | Levan |
| 5,946,048 | A | 8/1999 | Levan |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Chin et al. |
| 5,959,997 | A | 9/1999 | Moura et al. |
| 5,989,060 | A | 11/1999 | Coile et al. |
| 6,006,266 | A | 12/1999 | Murphy et al. |
| 6,016,388 | A | 1/2000 | Dillon |
| 6,049,524 | A | 4/2000 | Fukushima et al. |
| 6,052,718 | A | 4/2000 | Gifford |
| 6,078,575 | A | 6/2000 | Dommety et al. |
| 6,108,300 | A | 8/2000 | Coile et al. |
| 6,195,705 | B1 | 2/2001 | Leung |
| 6,345,294 | B1 | 2/2002 | O'Toole et al. |
| 6,397,260 | B1 | 5/2002 | Wils et al. |
| 6,487,605 | B1 | 11/2002 | Leung |
| 6,556,547 | B1 | 4/2003 | Srikanth et al. |
| 6,754,220 | B1 | 6/2004 | Lamberton et al. |
| 6,839,829 | B1 | 1/2005 | Daruwalla et al. |
| 6,856,591 | B1 | 2/2005 | Ma et al. |
| 6,885,633 | B1 | 4/2005 | Mikkonen |
| 6,885,667 | B1 | 4/2005 | Wilson |
| 6,928,478 | B1 | 8/2005 | Gangadharan |
| 6,934,292 | B1 | 8/2005 | Ammitzboell |
| 6,944,785 | B2 | 9/2005 | Gadir et al. |
| 7,006,431 | B1 | 2/2006 | Kanekar et al. |
| 7,042,876 | B1 | 5/2006 | Jayasenan |
| 7,058,007 | B1 | 6/2006 | Daruwalla et al. |
| 7,068,712 | B1 | 6/2006 | Zang et al. |
| 7,227,863 | B1 | 6/2007 | Leung et al. |
| 2001/0048661 | A1 | 12/2001 | Clear et al. |

OTHER PUBLICATIONS

Uyless Black, "TCP/I and Related Protocols", 1992, McGraw-Hill, Inc., pp. 226-249.

Chambless, et al., "Home Agent Redundancy Protocol (HARP)", Oct. 27, 1997.

Networking Working Group, RFC 2002 "IP Mobility Support", Oct. 1996.

Release notes, for 3Com Corporation, "Conducting a Redundant Route for Network Resiliency", Mar. 1994, NET Builder Family Bridge/Router, pp. 26-29.

J. Moy, RFC 1247, "OSPF Version 2", Jul. 19, 1991.

D. Oran, RFC 1142 "OSI IS-IS Intra-Domain Routing Protocol", Feb. 1990.

K. Egevang et al., "The IP Network Address Translator (NAT)", Network Working Group, pp. 1-10, May 1994.

Y. Rekhter, et al., "Address Allocation for Private Internets," RFC: 1918, Network Working Group, Feb. 1996, 9 pages.

P. Srisuresh, et al. "Load Sharing Using IP Network Address Translation (LSNAT)," RFC 2391, Network Working Group, Aug. 1998, 18 pages.

P. Srisuresh, et al., "IP Network Address Translator (NAT) Terminology and Considerations," RFC 2663, Network Working Group, Aug. 1999, 30 pages.

E. Gerich, "*Guidelines for Management of IP Address Space*," RFC: 1466, Network Working Group, May 1993, 10 Pages.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Nosella, et al. "Gateway Load Balancing Protocol," U.S. Appl. No. 09/883,674, filed Jun. 18, 2001, 48 Pages.

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc. -Global Internet Content Delivery-"How FreeFlow Works," webmaster@ akamai.com 1999-2000.

Digital Island, Inc. -e-Business Without Limits-, "Enabling Technologies," http ://www.digisle.net. No date.

Internap, "Preferred Collocation Services," http://www.internap. com Copyright © 2001 Internap Network Services Corporation.

Meyer, et al., Request For Comments No. 2026, entitled, "Generic Routing Encapsulation (GRE)," Jan. 2000, Internet Engineering Task Force, 9 ppages.

Mockapetris, P., Request For Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignment," U.S. Appl. No. 60/178,063, filed Jan. 24, 2000, 74 Pages.

Toole et al., "Fast-Changing Network Status and Load Monitoring and Feedback," U.S. Appl. No. 60/177,985, filed Jan. 25, 2000, 20 Pages.

Johnson et al., "Method and Apparatus for Determining a Network Topology in the Presence of Network Address Translation," U.S. Appl. No. 60/178,062, filed Jan. 24, 2000, 32 Pages.

Kirk Johnson, "A Method and Apparatus for Minimalist Approach to Implementing Server Selection," U.S. Appl. No. 60/177,415, filed Jan. 21, 2000, 39 Pages.

"Virtual Router Redundancy Protocol (VRRP)", White Paper, Nortel Networks, 2000.

ENHANCED INTERNAL ROUTER REDUNDANCY

CROSS REFERENCE TO RELATED PATENT APPLICATION

This application is a continuation of prior application U.S. patent application Ser. No. 10/016,866, entitled ENHANCED INTERNAL ROUTER REDUNDANCY, by Peter J. O'Riordan, filed 14 Dec. 2001, now U.S. Pat. No. 7,227,838 from which priority under 35 U.S.C. §120 is claimed, and which application is incorporated herein by reference in its entirety for all purposes.

BACKGROUND OF THE INVENTION

The present invention relates to networking technology. More particularly, the present invention relates to providing redundancy in a network for forwarding data between different hosts within such network.

Local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it receives a request to send a data packet to an address that it does not recognize as being local, it communicates through a router (or other layer-3 device) which determines how to direct the packet between the host and the destination address. Unfortunately, a router may, for a variety of reasons, become inoperative (e.g., a power failure, rebooting, scheduled maintenance, etc.). Such potential router failure has led to the development and use of redundant systems, systems having more than one router to provide a back up in the event of primary router failure. When a router fails, the host communicating through the inoperative router may still remain connected to other LANs if it can send packets to another router connected to its LAN.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host can not send packets outside of its LAN. This will be true even though there may be a redundant router able to take over because the host does not know about the backup. Unfortunately, such systems have been used in mission critical applications such as stock trading. The shortcomings of these early systems led to the development and implementation of a hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 patent"), entitled STANDBY ROUTER PROTOCOL, issued Dec. 5, 1995 to Cisco Systems, Inc., which patent is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which document is incorporated herein by reference in its entirety for all purposes.

HSRP forwards data packets from a host on a LAN through a virtual router. The host is configured so that the packets it sends to destinations outside of its LAN are always addressed to the virtual router. The virtual router may be any physical router elected from among a group of routers connected to the LAN. The router from the group that is currently emulating the virtual router is referred to as the "active" router. Thus, packets addressed to the virtual router are handled by the active router. A "standby" router, also from the group of routers, backs up the active router so that if the active router becomes inoperative, the standby router automatically begins emulating the virtual router. This allows the host to always direct data packets to an operational router without monitoring the routers of the network.

Although the host is only aware of a single virtual router, the routers within the HSRP group are aware of each other. All other routers in the network also see every router in the HSRP group. That is, the routers each have their own MAC and IP addresses through which they communicate with each other. The routers of a particular HSRP group communicate with each other, for example, to determine which router is to be the active router and which is to be the standby router. Managing multiple routers having unique IP and MAC addresses within an HSRP group results in an undesirable level of complexity. Additionally, managing and ensuring scalable growth with an ever increasing number of routers within each HSRP group will likely become a significant problem in the near future. In view of the above, it would be desirable to provide an alternative redundant router scheme.

SUMMARY OF THE INVENTION

Accordingly, the present invention provides methods and apparatus for providing redundant data forwarding or routing capabilities. In one embodiment, a network device includes a designated router and a non-designated router. The designated router generally provides layer 3 switching or routing for data received into the network device. Although the non-designated router is active, it generally does not provide forwarding capabilities until the designated router fails. The non-designated router's logical interfaces are disabled, while the designated router's logical interfaces are enabled. The non-designated router becomes the new designated router when the first designated router fails. In general terms, the routers of the network device provide redundancy with the network being aware of only a single router within network device. That is, the network is only aware of a single router. This is accomplished by having the routers share the same IP and MAC address on each of their corresponding pairs of interfaces. The routers do not each also use a unique IP and MAC address in addition to the shared IP and MAC interface addresses, in contrast to conventionally configured routers of the hot standby router protocol (HSRP).

In one embodiment, a network system operable to forward data within a computer network is disclosed. The network system includes a first router having a plurality of first logical interfaces corresponding to one or more physical ports of the network device. The first router is configured to enable the first logical interfaces when the first router is assigned to be a designated router and to disable the first logical interfaces when the first router is not assigned to be designated router. The network system also has a second router having a plurality of second logical interfaces corresponding to one or more physical ports of the network device. The second router is configured to enable the second logical interfaces when the second router is assigned to be a designated router and to disable the second logical interface when the second router is not assigned to be a designated router. The network system further includes a supervisor module configured to assign a selected one of the first and second routers to be a designated router. The first router has the same internet protocol (IP) address and media access control (MAC) address per interface as the second router.

In a specific implementation, the first router is further configured to inform the second router about any change in a configuration of its first interfaces when it is assigned as the designated router and to change the configuration of its first interfaces to correspond to a change in configuration of the second interfaces when it is not assigned as the designated router and the second router informs the first router of such a change in the configuration of the first interfaces so that the first interfaces have a same number and configuration as the second interfaces. The second router is further configured to inform the first router about any change in the configuration of its second interfaces when it is assigned as the designated router and to change the configuration of its second interfaces to correspond to a change in state of the first interfaces when it is not assigned as the designated router and the first router informs the second router of such a change in the configuration of the second interfaces so that the first interfaces have a same number and configuration as the second interfaces as the second interfaces.

In a further aspect, the network system includes a control bus for managing the first and second router and the supervisor module and a data bus through which data is received and transmitted into and out of the physical ports of the network device. In another embodiment, the supervisor module is further configured to poll the currently assigned designated router to determine whether the designated router has failed and when the designated router has failed, to assign another of the routers to be a designated router.

In another implementation, the first router is further configured to enable the first interfaces by setting a link state of each first interface to an "up" value and to disable the first interfaces by setting a link state associated with each first interface to a "down" value. The second router is further configured to enable the second interfaces by setting a link state of each second interface to an "up" value and to disable the second interfaces by setting a link state associated with each second interface to a "down" value. The first and second interfaces each have an associated administrative state that may be set by a user or the supervisor module to an "up" or "down" state to thereby enable or disable, respectively, the interface. The first and second routers are both configured to maintain the same values for their interface's administrative states.

In another embodiment, the first router is further configured to enable a selected first interface when a new virtual local area network (VLAN) that corresponds to one or more physical ports and the selected first interface is created in the supervisor module when the first router is assigned as the designated router. A link state of the selected first interface is enabled by setting a corresponding link state to "up." The second router is further configured to enable a selected second interface when a new virtual local area network (VLAN) that corresponds to one or more physical ports and the selected second interface is created in the supervisor module when the second router is assigned as the designated router. A link state of the selected second interface is enabled by setting a corresponding link state to "up." In a further aspect, the first router is configured to enable the selected first interface after the first router is informed that the new VLAN has been created, and the second router is configured to enable the second first interface after the second router is informed that the new VLAN has been created.

In an alternative application, a router redundancy system is disclosed. The router redundancy system includes a first network system as described above. The first network device is also configured with a hot standby protocol. The router redundancy system also includes a second network system as described above. The second network system is configured with a hot standby router protocol. The first and second network systems are configured to act as an active router and a standby router within a hot standby router protocol group.

In yet a further embodiment, the invention pertains to a computer program product for forwarding data within a computer network. The computer program product has at least one computer readable medium and computer program instructions stored within at least one of the computer readable product configured to perform at least some of the above described method operations described with respect to the network device.

In a another embodiment, the invention pertains to a method for providing data forwarding redundancy with a first router having a plurality of first logical interfaces corresponding to one or more physical ports of a network device, a second router having a plurality of first logical interfaces corresponding to one or more physical ports of the network device, and a supervisor module. The method includes configuring each pair of the first and second interfaces with a same IP and MAC address and assigning a selected one of the first and second routers to be a designated router. The method further includes enabling the first logical interfaces when the first router is assigned to be a designated router, and enabling the second logical interfaces when the second router is assigned to be a designated router. Finally, the method includes disabling the first logical interfaces when the first router is not assigned to be a designated router, and disabling the second logical interfaces when the second router is not assigned to be a designated router.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
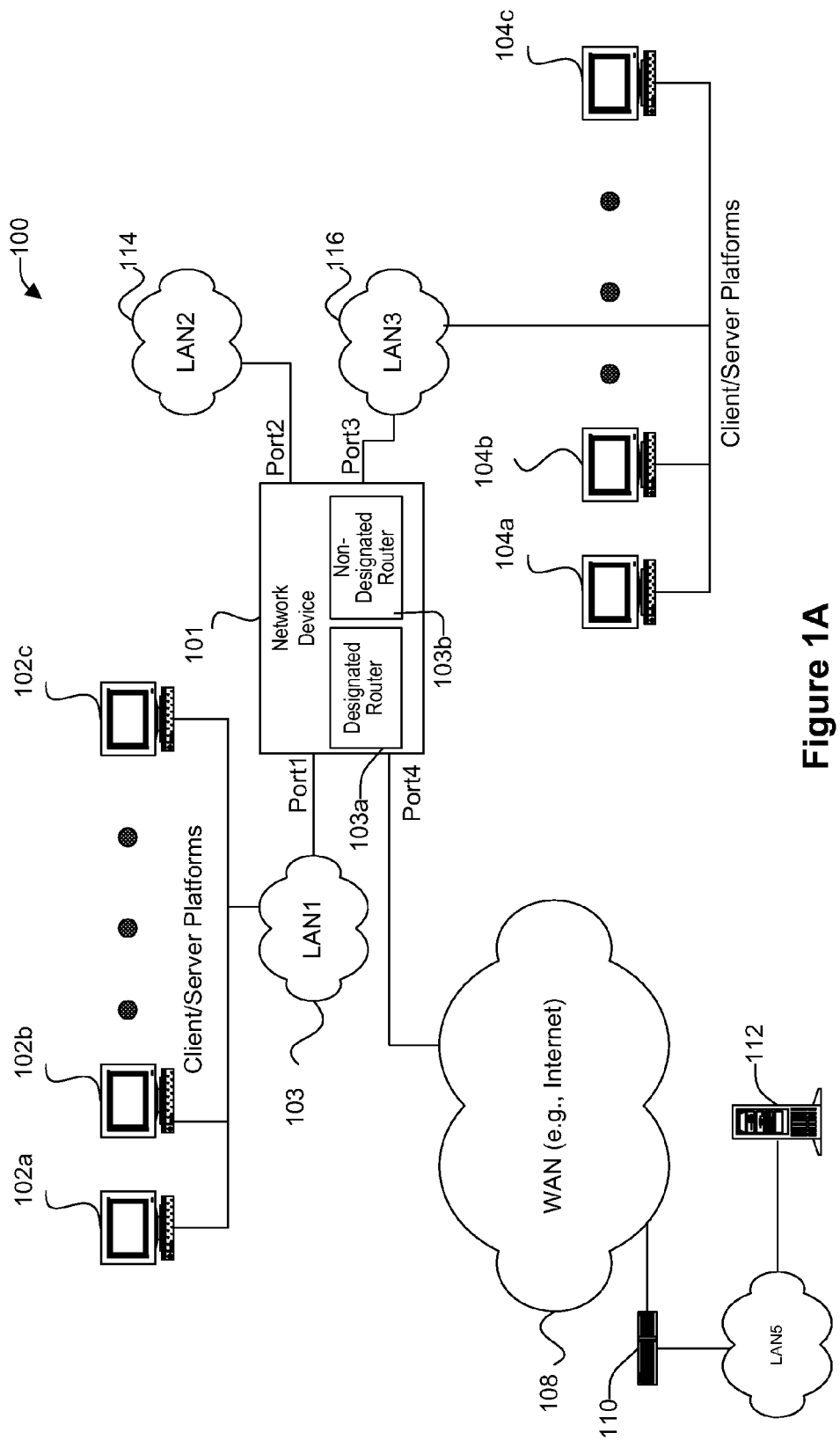
FIG. 1A is a diagrammatic representation of a computer network in which the present invention may be implemented.

FIG. 1A is a diagrammatic representation of a network in which the present invention may be implemented. As shown, the network 100 includes network device 101 having Port 1, Port 2, Port 3, and Port 4. The network device may include any suitable number and type of ports or interfaces. As shown, ports 1 through 3 are coupled with local area networks (LAN's) 103, 114, and 116. Port 4 is coupled with a wide area network (WAN) 108, such as the Internet.

Figure 1B:
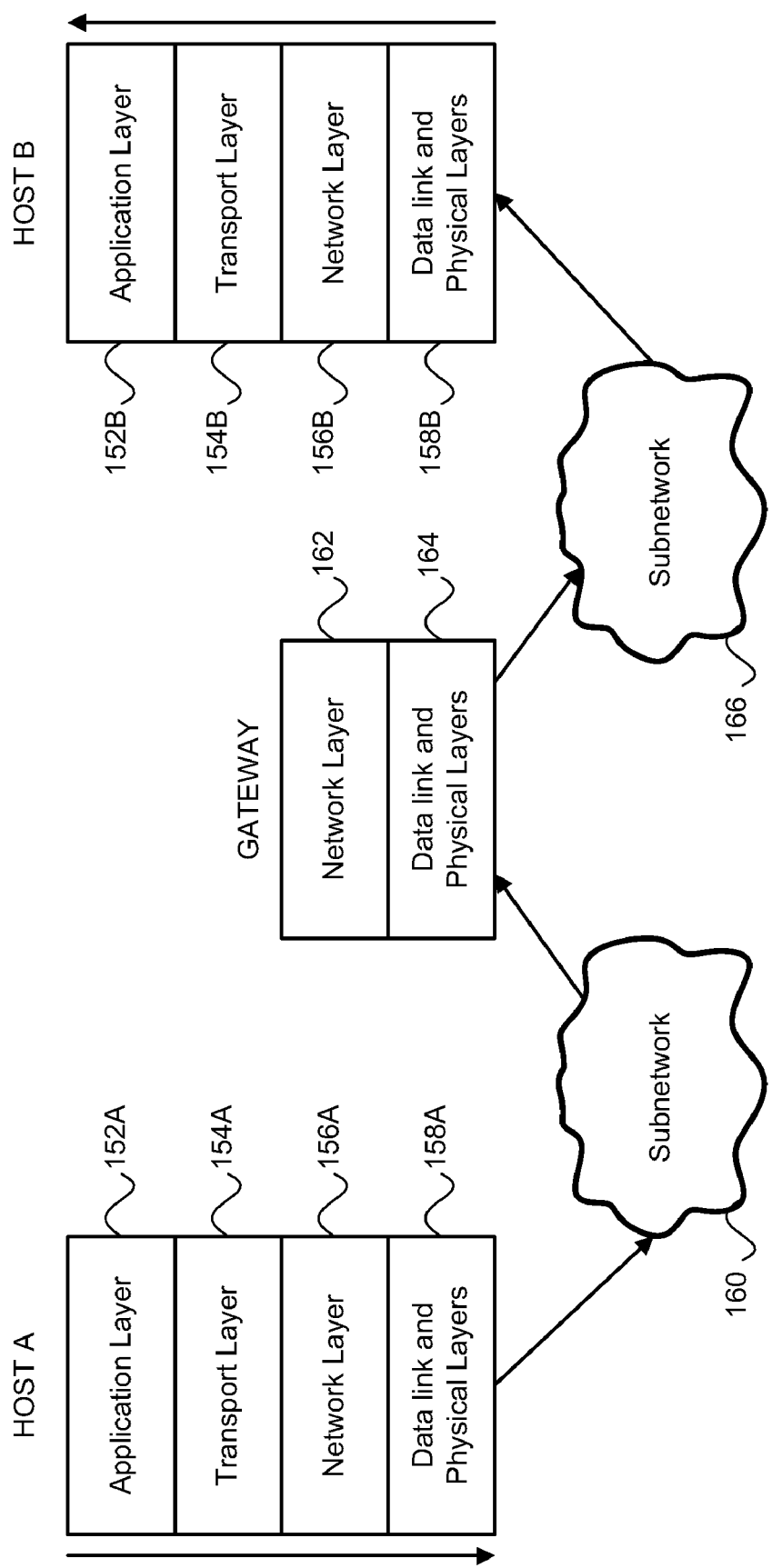
FIG. 1B illustrates the relationship of subnetworks and gateways to layered protocols.

Each port of the network device 101 is associated with a different subnetwork, and the network device serves as a "gateway" between these different subnetworks, as well as a mechanism for forwarding data within an individual subnetwork. FIG. 1B illustrates the relationship of subnetworks and gateways to layered protocols. Assume that the user application 152A in host A sends an application protocol data unit (PDU) to an application layer protocol 152B in host B, such as, for example, a file transfer system. The file transfer software performs a variety of functions and sends file records to the user data. In many systems, the operations at host B are known as server operations and the operations at host A are know as client operations.

As indicated by the downward arrows in the protocol stack at host A, this unit is passed to the transport layer protocol 154A, which performs a variety of operations and adds a header to the PDU passed to it. At this point, the unit of data is often referred to as a segment. The PDU from the upper layers is considered to be data to the transport layer.

Next, the transport layer passes the segment to the network layer 156A, also called the IP layer, which again performs specific services and appends a header. This unit (now called a datagram in internet terms) is passed down to the lower layers. Here, the data link layer adds its header as well as a trailer, and the data unit (now called a frame) is launched into subnetwork 160 by the physical layer 158A. Of course, if host B sends data to host A, the process is reversed and the direction of the arrows is changed.

Internet protocols are typically unaware of what goes on inside the network. The network manager is free to manipulate and manage the PDU in any manner necessary. In some instances, however, the internet PDU (data and headers) remains unchanged as it is transmitted through the subnet. In FIG. 1B, it emerges at the gateway where it is processed in the lower layers 164. This lower layer includes the Data Link Layer, commonly referred to as Layer 2, processing which is capable of switching or forwarding the unit to a destination within the same subnetwork. The unit is forwarded to a destination that corresponds to the unit's MAC destination address. However, if the unit is destined for a subnetwork that differs from its source subnetwork, the unit is passed to the IP (network) layer 162. Here, routing decisions are made based on the destination IP address provided by the host computer.

After these routing decisions have been made, the PDU is passed to the communications link connected to the appropriate subnetwork (comprising the lower layers). The PDU is re-encapsulated into the data link layer frame and passed to the next subnetwork 166, where it finally arrives at the destination host.

The destination (host B) receives the traffic through its lower layers and reverses the process that transpired at host A; it de-encapsulates the headers by stripping them off in the appropriate layer. The header is used by the layer to determine the actions it is to perform; the header therefore governs the layer's operations.

The PDU created by the file transfer application in the application service layer is passed to the file transfer application residing at host B. If host A and B are large mainframe computers, this application is likely an exact duplicate of the software at the transmitting host. The application might, however, perform a variety of functions, depending on the header it receives. It is conceivable that the data could be passed to another end-user application at host B, but in many instances the user at host A merely wants to obtain the services of a server protocol, such as a file transfer or email. If this is the case, it is not necessary for an end-user application process to be invoked at host B.

To return the retrieved data from the server at host B to the client at host A, the process is reversed. The data is transferred down through the layers in the host B machine, through the network, through the gateway, to the next network, and up the layers of host A to the end-user.

Referring back to FIG. 1A, the network device 101 provides both Layer 2 and Layer 3 switching or routing. For example, a client 102a may wish to send data to a server 102c within the same LAN 103. To accomplish this, client 102a sends data to Port 1 of network device 101, and the network device 101 sends the data out through Port 1 to server 102c using Layer 2 switching or forwarding. Layer 2 switching may also include forwarding data between different LAN's that belong to the same logical or virtual LAN (VLAN). In another example, client 102a of LAN 103 may wish to send data to client 104a of a different LAN 116. Accordingly, client 102a sends data to Port 1 of network device 101. If port 1 does not belong to the same VLAN as port 3, the network device then routes the data through Port 3 to server 104a of LAN 116 using Layer 3 switching forwarding.

The network device 101 is also configured to provide redundant routing capabilities. As shown, the network device includes a designated router 103a and a non-designated router 103b. The designated router 103a generally provides all of the layer 3 switching or routing for data received into network device 101. Although the non-designated router 103b is active, it does not provide forwarding capabilities until the designated router 103a fails. That is, the non-designated router 103b becomes the new designated router 103b when the first designated router 103a fails. In general terms, the routers of the network device 101 provide redundancy with the network 100 being aware of only a single router within network device 101. That is, the network 100 is only aware of a single router IP and MAC address for each interface. This is accomplished by having the routers 103 share the same IP and MAC address for each interface. The routers of the present invention do not each also use a unique IP and MAC address in addition to the shared IP and MAC interface address, in contrast to conventionally configured routers of the hot standby router protocol (HSRP).

Generally, the router redundancy techniques of the present invention may be implemented on software and/or hardware. For example, these techniques can be implemented in an operating system kernel, in a separate user process, in a library package bound into network applications, on a specially constructed machine, or on one or more network interface cards. In a specific embodiment of this invention, the technique of the present invention is implemented in software such as an operating system or in an application running on an operating system.

A software or software/hardware router redundancy service of this invention may also be implemented on a general-purpose programmable machine selectively activated or reconfigured by a computer program stored in memory. Such programmable machine may be a network gateway device designed to handle network traffic. Such network devices typically have multiple network interfaces including frame relay and ISDN interfaces, for example. Specific examples of such network devices include routers and/or switches. For example, the redundancy techniques of this invention may be specially configured routers such as specially configured hybrid layer 2 and layer 3 switch or router models Catalyst 5000, 6000, Catalyst 4000, Catalyst 3550 available from Cisco Systems, Inc. of San Jose, Calif. A general architecture for some of these machines will appear from the description given below. In an alternative embodiment, the router redundancy service may be implemented on a general-purpose network host machine such as a personal computer or workstation. Further, the invention may be at least partially implemented on one or more cards (e.g., interface cards) for a network device or a general-purpose computing device.

Figure 2A:
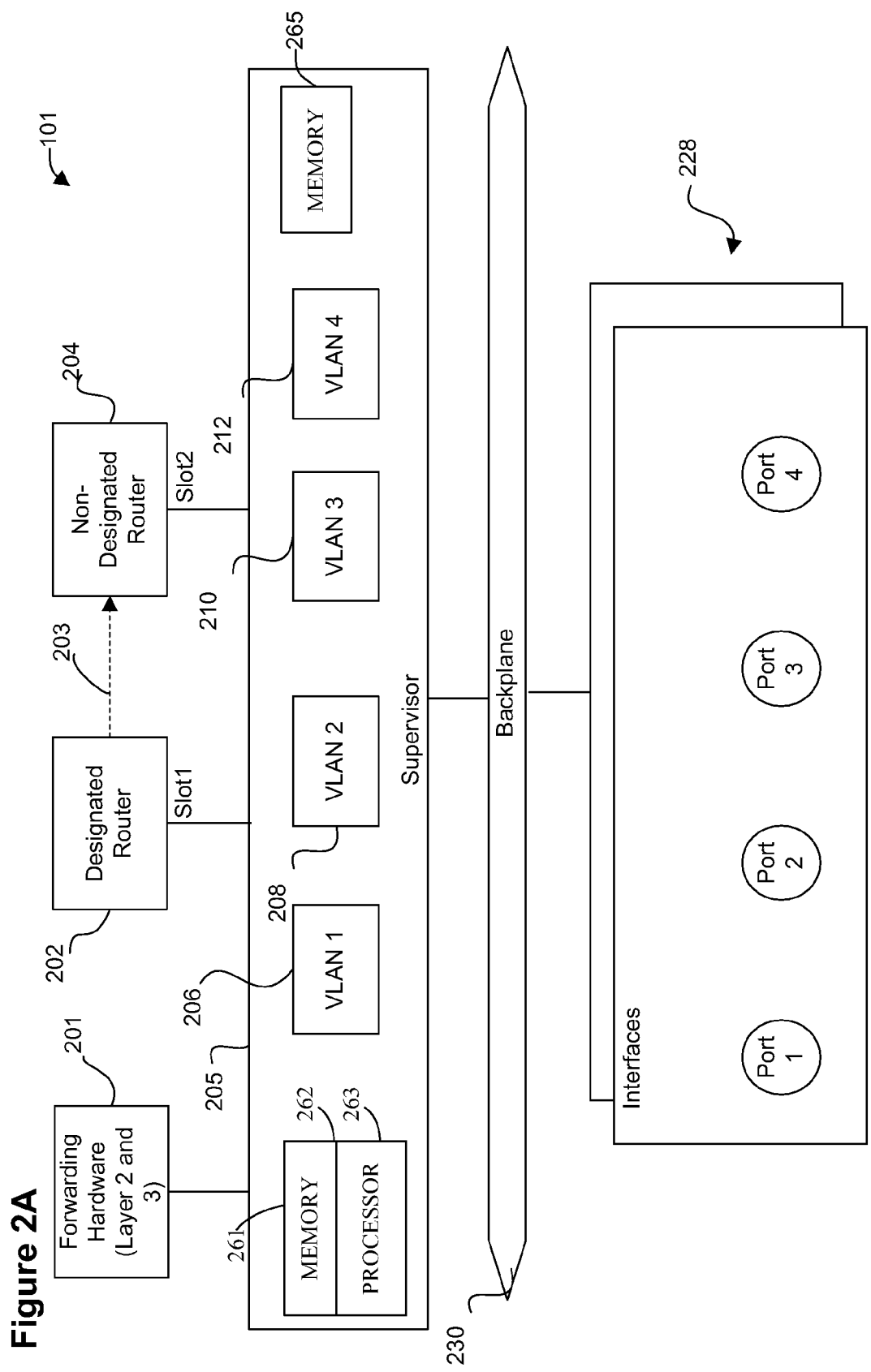
FIG. 2A is a diagrammatic representation of the network device of FIG. 1A in accordance with one embodiment of the present invention.

FIG. 2A is a diagrammatic representation of the network device 101 of FIG. 1A in accordance with one embodiment of the present invention. As shown, the network device 101 includes a first router 202 and a second router 204 for providing redundant layer 3 routing, a supervisor 205 for managing the first and second routers and managing layer 2 forwarding, a forwarding hardware module 201 for providing layer 2 and layer 3 forwarding, and a plurality of interfaces 228 for receiving and transmitting data through ports 1 through 4. The first and second routers are each coupled to the supervisor in slot 1 and slot 2, respectively. The supervisor 205 and interfaces 228 are coupled to backplane 230. The routers are also coupled to the backplane 230 through supervisor 205. The backplane 230 includes a data bus for processing data received and transmitted through the Ports 1 through 4 and a control bus (not shown) for communication between the various components of the network device 101.

The supervisor may include a master central processing unit (CPU) 262. When acting under the control of appropriate software or firmware, the CPU 262 is responsible for layer 2 switching tasks and network management. It may also be responsible for the managing router redundancy mechanisms as listed and described below. It may accomplish all these functions under the control of software including an operating system (e.g., the Internetwork Operating System (IOS®) of Cisco Systems, Inc.) and any appropriate applications software. In the illustrated embodiment, each of the routers 202 and 204 also each include a CPU (not shown) for providing router redundancy capabilities, such as routing or layer 3 switching or routing tasks and routing table management. The forwarding hardware is configurable by the supervisor 205 and/or designated router 202 to provide layer 2 and layer 3 forwarding, respectively. Accordingly, the forwarding hardware has access to the data bus of the backplane 230 through supervisor 205. Of course, the forwarding hardware may form part of the supervisor 205 or routers 202 and 204.

CPU 262 may include one or more processors 263 such as a processor from the Motorola family of microprocessors or the MIPS family of microprocessors. In an alternative embodiment, processor 263 is specially designed hardware for controlling the operations of network device 101. In a specific embodiment, a memory 261 (such as non-volatile RAM and/or ROM) also forms part of CPU 262. However, there are many different ways in which memory could be coupled to the system. Memory block 261 may be used for a variety of purposes such as, for example, caching and/or storing data (including, for example, addresses), programming instructions, etc.

The supervisor may also be configured with one or more virtual LAN's (VLAN's). As shown, the supervisor is configured with four VLANS 206, 208, 210, and 212. A VLAN is a LAN based on logical connections instead of physical connections, thereby providing added flexibility. In other words, a VLAN represents one or more LAN's or ports of the network device 101.

Figure 2B:
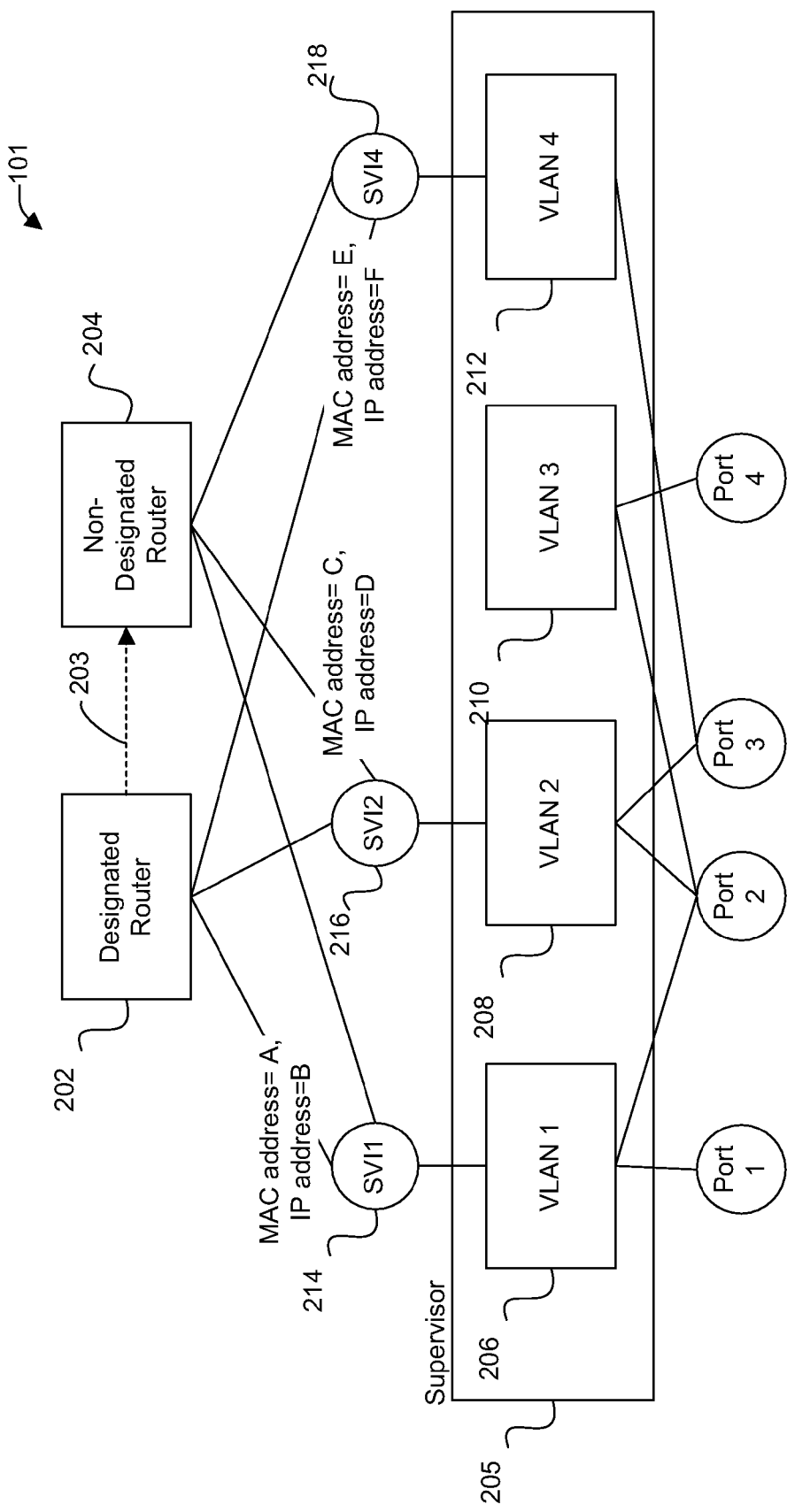
FIG. 2B illustrates how the ports of the network device are logically arranged in accordance with one example implementation of the present invention.

The supervisor also manages the two routers 202 and 204. For example, the supervisor is configured to specify one of the routers as the designated router, while the other router remains the non-designated router. As shown, router 202 is the designated router, while router 204 is the non-designated router. Both of the routers have the same MAC address and IP address for each interface (as shown in FIG. 2B). Additionally, the designated router 202 is configured to send any change in its configuration 203 to the non-designated router 204 through the control path of the back plane 230. A configuration change may be sent using any suitable out-of-band mechanism so as long as a unique IP and MAC address are not required for each of the two routers.

The interfaces 268 are typically provided as interface cards (sometimes referred to as "line cards"). Generally, they control the sending and receiving of data packets over the network and sometimes support other peripherals used with the network device 101. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 262 and routers 202 and 204 to efficiently perform switching and routing computations, network diagnostics, security functions, etc.

Although the system shown in FIG. 2A is one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 265) configured to store data, program instructions for the general-purpose network operations and/or other operations described herein. The program instructions may control the operation of an operating system and/or one or more applications, for example. The memory or memories may also be configured to store addresses, timer limits, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

FIG. 2B illustrates how the ports of the network device 101 are logically arranged in accordance with one example implementation of the present invention. Each VLAN of the supervisor 205 is associated with one or more ports. For example, VLAN 206 is associated with Port 1 and Port 2, VLAN 208 is associated with Port 2 and Port 3, VLAN 210 is associated with Port 2 and Port 4, and VLAN 212 is associated with Port 3. Since the supervisor 205 is a layer 2 switch, it can only forward packets between ports that are both associated with a same VLAN. For instance, when the supervisor 205 receives a packet on Port 1, it can only send the packet out through Port 1 or Port 2 since they form the same VLAN 206.

Each of the routers may include one or more interfaces that correspond to one or more of the VLAN's. Each router preferably maintains the same interface arrangement. As shown, each router is associated with Switch Virtual Interfaces (SVI) SVI 214, SVI 216, and SVI 218. As shown, router 202 is the designated router, while router 204 is the non-designated router. Both of the routers have the same MAC address and IP address for each interface. Each SVI has a same IP and MAC address for both the designated and non-designated routers. As shown, SVI1 has MAC address "A" and IP address "B" for both the designated router 202 and non-designated router 204. Likewise, the IP and MAC addresses are the same for both routers for SVI2 and SVI4. In the illustrated example, the interface for VLAN 210 has been disabled. Techniques for enabling and disabling the routers interfaces are described further below with reference to FIGS. 3 through 6.

Figure 3:
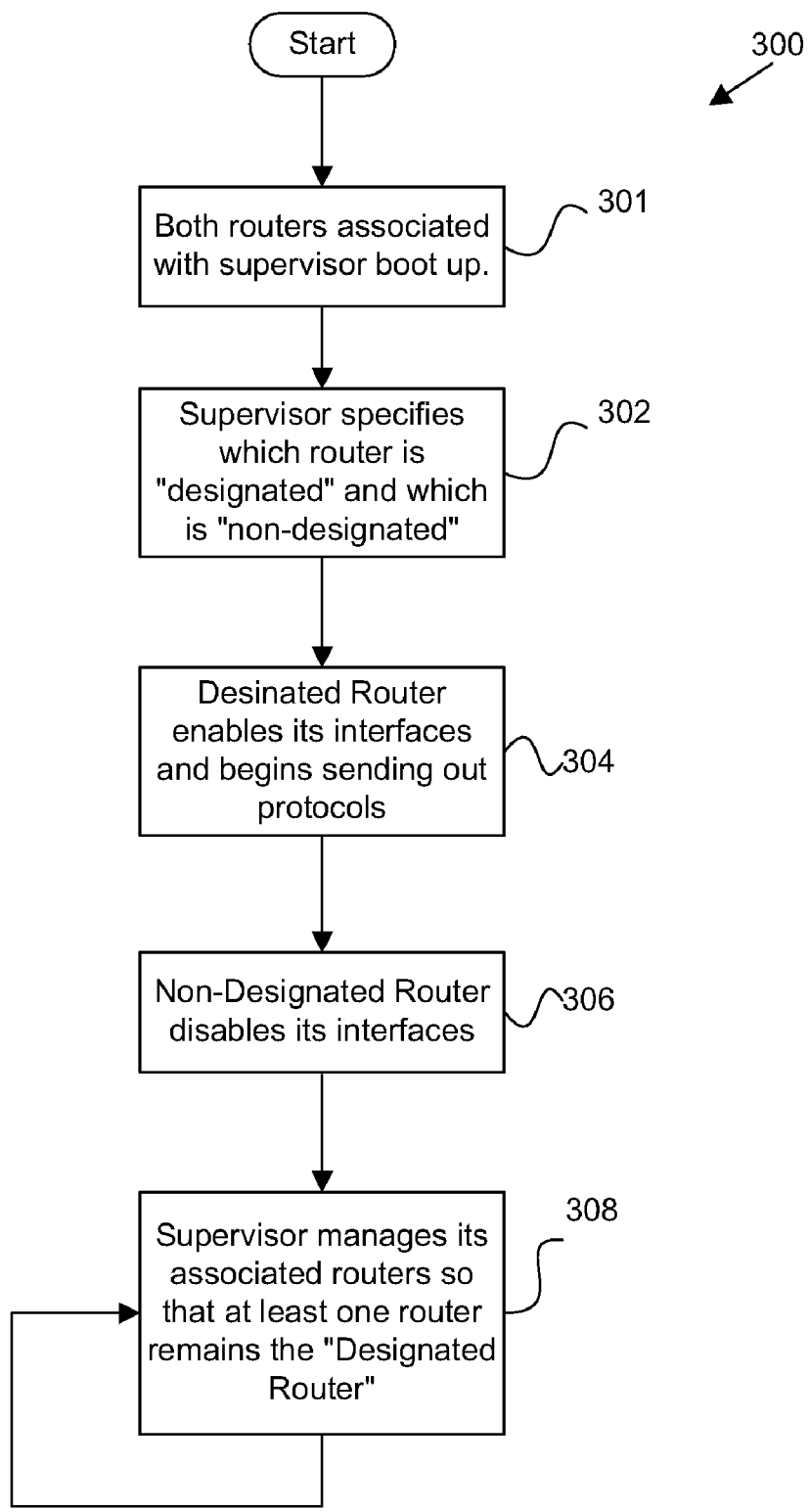
FIG. 3 is a flow chart illustrating a procedure for providing redundant data forwarding mechanisms in accordance with one embodiment of the present invention.

FIG. 3 is a flow chart illustrating a procedure 300 for providing redundant data forwarding mechanisms in accordance with one embodiment of the present invention. Initially, both routers fully boot up in operation 301. The supervisor 205 may then specify which router is designated and which router is non-designated in operation 302. The supervisor may select a router as the designated router using any suitable criteria. For example, the supervisor may initially select the router positioned in slot 1 as the designated router. Alternatively, the supervisor may poll each router as they boot to determine which has finished the boot process first. The supervisor then selects the router to finish its boot first as the designated router. The supervisor may specify this designation to the routers in any suitable manner. In one implementation, the supervisor sends a message to both routers 202 and 204 indicating whether there is a router present in slot 1 and if so, whether the router in slot 1 is the designated router. The message also indicates whether there is a router present in slot 2 and if so, whether the router in slot 2 is the designated router.

After the routers receive a designation message from the supervisor 205, the designated router then enables its interfaces and begins sending out protocols in operation 304. That is, the designated router may now receive and send data through its interfaces. In contrast, the non-designated router disables its interfaces so that it cannot receive or send data through its interfaces in operation 306. However, since the non-designated router is coupled to the backplane, the supervisor or designated router may still communicate with the non-designated router through the control bus of the backplane. Likewise, the supervisor 205 may communicate with the designated router through the control bus of the backplane.

The supervisor 205 then continues to manage its associated routers so that at least one router remains the designated router in operation 308. In one implementation, the supervisor polls the designated router to determine whether the designated router is still working properly. If the designated router becomes disabled, the supervisor will send a new message to the routers indicating a new designated router. For example, the supervisor indicates that the router in slot 2 is the designated router and the router in slot 1 is a non-designated router. The supervisor also adds the new designated router to the list of ports in each VLAN.

Figure 4:
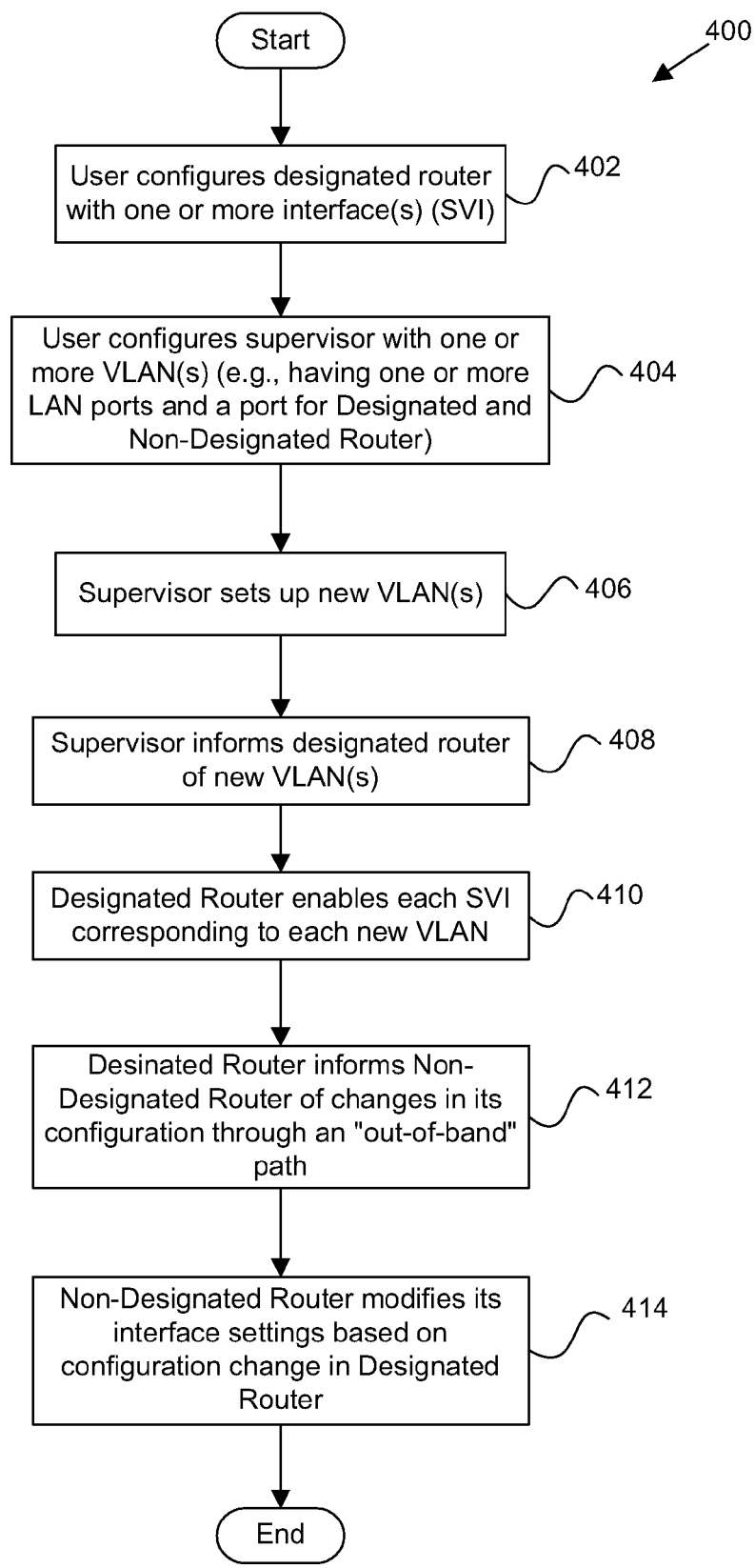
FIG. 4 is a flowchart illustrating a procedure for forming and enabling an interface for a particular router in accordance with one embodiment of the present invention.

An interface (e.g., SVI) associated with the designated router may be formed and enabled in any suitable manner. FIG. 4 is a flowchart illustrating a procedure 400 for forming and enabling an interface for a particular router in accordance with one embodiment of the present invention. Initially, a user may configure the designated router with one or more SVI's in operation 402. Each SVI may be formed by setting up suitable data structures that represents the new SVI and is associated with the designated router.

Figure 5:
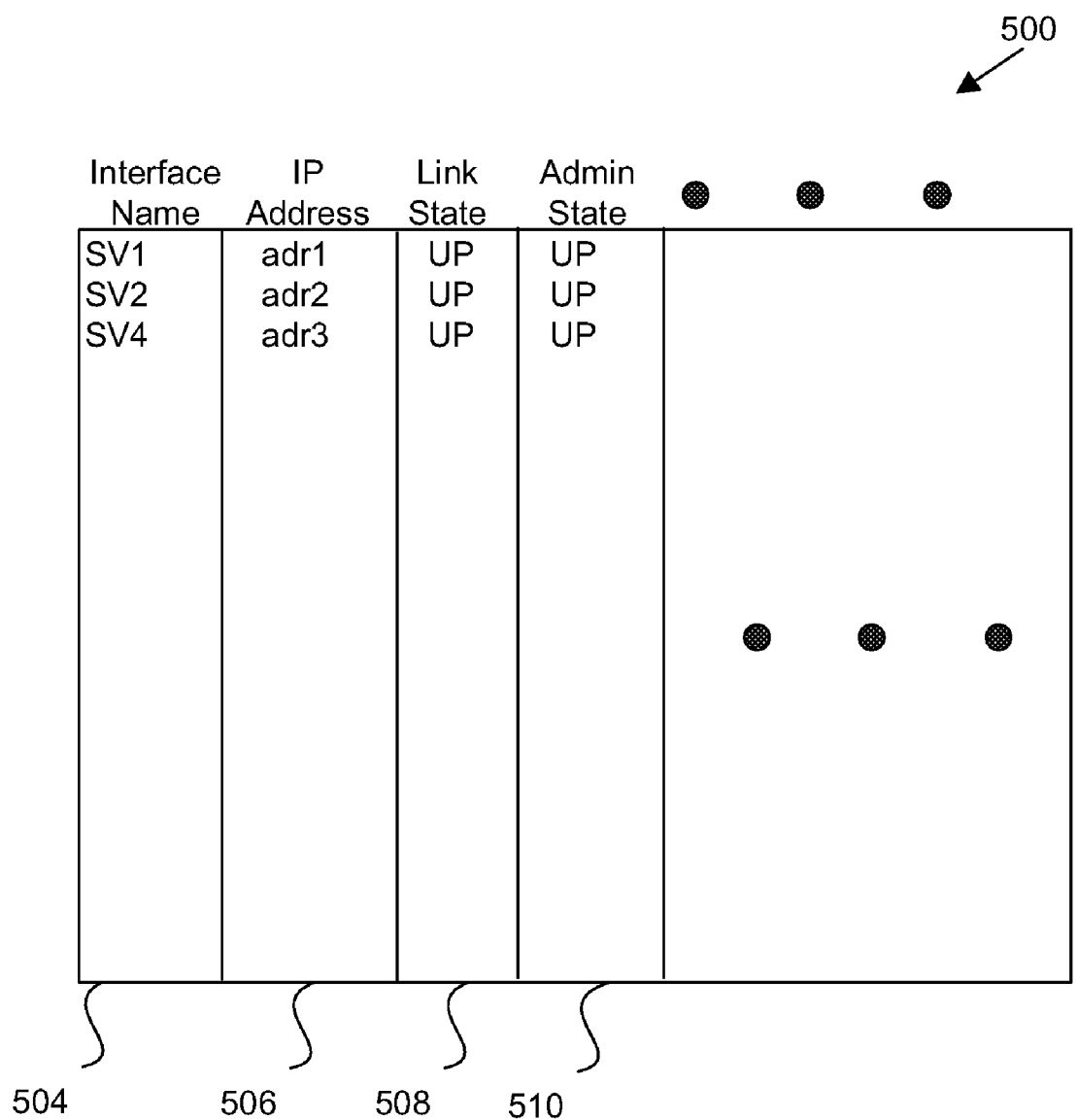
FIG. 5 illustrates a interface descriptor block (IDB) of the designated router in accordance with one embodiment of the present invention.

FIG. 5 illustrates a interface descriptor block (IDB) 500 of the designated router in accordance with one embodiment of the present invention. In the illustrated embodiment, when the user configures an SVI, the SVI is entered within the IDB table 400 of the designated router (e.g., 202). As shown, the IDB table includes a plurality of fields. These fields may include, but are not limited to, an interface name 504, an IP address 506, a link state 508, and an administrative state 510. Each of these fields are associated with a particular SVI. The interface name, of course, indicates the name of the SVI (e.g., SVI2). Each SVI is also associated with an IP address value. For example, SVI 1 has IP address "adr1".

The link state and administrative state together indicate whether the SVI is enabled or disabled. The administrative state field is set by a user to have either an "up" state or a "down" state (e.g., within the initial SVI creation command). An up value indicates that data should be processed through the respective SVI, while a down value indicates that data cannot be processed through the corresponding SVI. When a user forms a new SVI, the administrative state is typically set to an "up" value. However, a user may also set the administrative state of any new or existing SVI to a down value.

The link state is conventionally used in particular applications where the router is coupled with physical ports to indicate the physical state of the interface. However, since the routers of the illustrated embodiment are not coupled with the physical ports, each router may instead use the link state to disable the interfaces when the router is a non-designated router and enable the interfaces when the router is a designated router. When the router is a designated router, the link state of each interface is set to an up state (assuming that the Supervisor has told it that underlying VLAN is present). When the router is a non-designated router, the link states are set to a down state. When the link state has an down value, the corresponding interface is considered by the router to be disabled, even when the administrative state has an up value. When the link state has an up value, the corresponding interface is enabled if the administrative state also has an up value. Each SVI will typically be configured with a unique IP and MAC address.

The user may also configure one or more VLAN(s) in the supervisor 205 in operation 404. The user may configure VLAN(s) prior to configuring SVI(s) in the designated router. In sum, either an SVI or VLAN may be configured at any time. In a Cisco network device, a user may issue a command using a Command Language Interface (CLI) through the control bus of the network device. In the example of FIG. 2B, the user may issue a command to set up VLAN 208 to include ports 2 and 3. The supervisor receives this command through the control bus and then sets up the new VLAN within the supervisor or switch 205 in operation 406. Specifically, one or more LAN ports are associated with the new VLAN. A port corresponding to an SVI of the designated router is also associated with the new VLAN.

The supervisor then informs the designated router of the new VLAN(s) in operation 408. The designated router then enables each SVI (e.g., by setting the link state to "Up") associated with each new corresponding VLAN in operation 410. The designated router also informs the non-designated router of any changes in its configuration (e.g., creation of a new SVI or disabling or enabling of an existing SVI through a change in the administrative state) through an out of bound path in operation 412. For example, a configuration file is sent through the black plane control path. The configuration file generally contains commands received and processed by the designated router. The non-designated router then creates a new SVI or modifies an existing SVI settings based on the change in configuration of the designated router in operation 414. In a specific implementation, the non-designated router modifies or forms an SVI by modifying or creating an entry within its own IDB table. However, since the non-designated router is not the designated router and is, accordingly, not responsible for forwarding data, the link state of the new interface associated with the non-designated router remains in a down state to thereby disable the new interface. The interfaces of the non-designated router are enabled (e.g., link states are set to "up") when the router becomes a new designated router.

The user may also disable a particular VLAN by deleting the particular VLAN. The supervisor may then tells the designated router to change the link state of the corresponding SVI to a link "down" value. Alternatively, a user may disable a particular SVI of the designated router by setting its administrative state to a "down" state. When this change occurs, the designated router communicates this SVI configuration change to the non-designated router. The non-designated router may then change its corresponding SVI administrative state to a "down" value.

Each of the redundant routers (e.g., routers 202 and 204) may change their SVI configuration without the change being visible to the network. For example, if the switch/supervisor 205 is configured to forward data using hardware, this hardware forwarding may continue to minimize forward impact. Since only the router's logical interfaces are affected during a switchover (i.e., the non-designated router replaces the designated router as a new designated router), the physical layer 2 connections are not perturbed. Additionally, since the routers share a same MAC and IP address for each interface, the network only sees a single router. Accordingly, one router may replace the other without such change being visible to the rest of the network. In other words, neighboring routers will only see a single designated or active router at a time.

The L3 forwarding of packets may be done in forwarding hardware (e.g., 201 of FIG. 2A) under the control of the designated router. The control information is generated from the routing protocols that the designated router runs with the other routers in the network. When the non-designated router becomes designated it has no routing information that it can use to forward packets since it has been isolated from the network. What it looks like to other routers in the network is that the same router (i.e. because the MAC and IP interface addresses are the same) suddenly went down and came back up again, losing all its forwarding information in the process. By retaining the forwarding information in the forwarding hardware, the hardware can continue to forward packets (based on the last information the old designated router had configured in the hardware before the old designated router went down) while the newly designated router learns the network topology and all its routing protocols converge. Without hardware forwarding (or some other way to keep forwarding packets while the newly designated router is converging), more packets would be dropped after the switchover, and the switchover would be far more visible to the user. Having this hardware assist allows a more reliable level of data packet forwarding.

Figure 6:
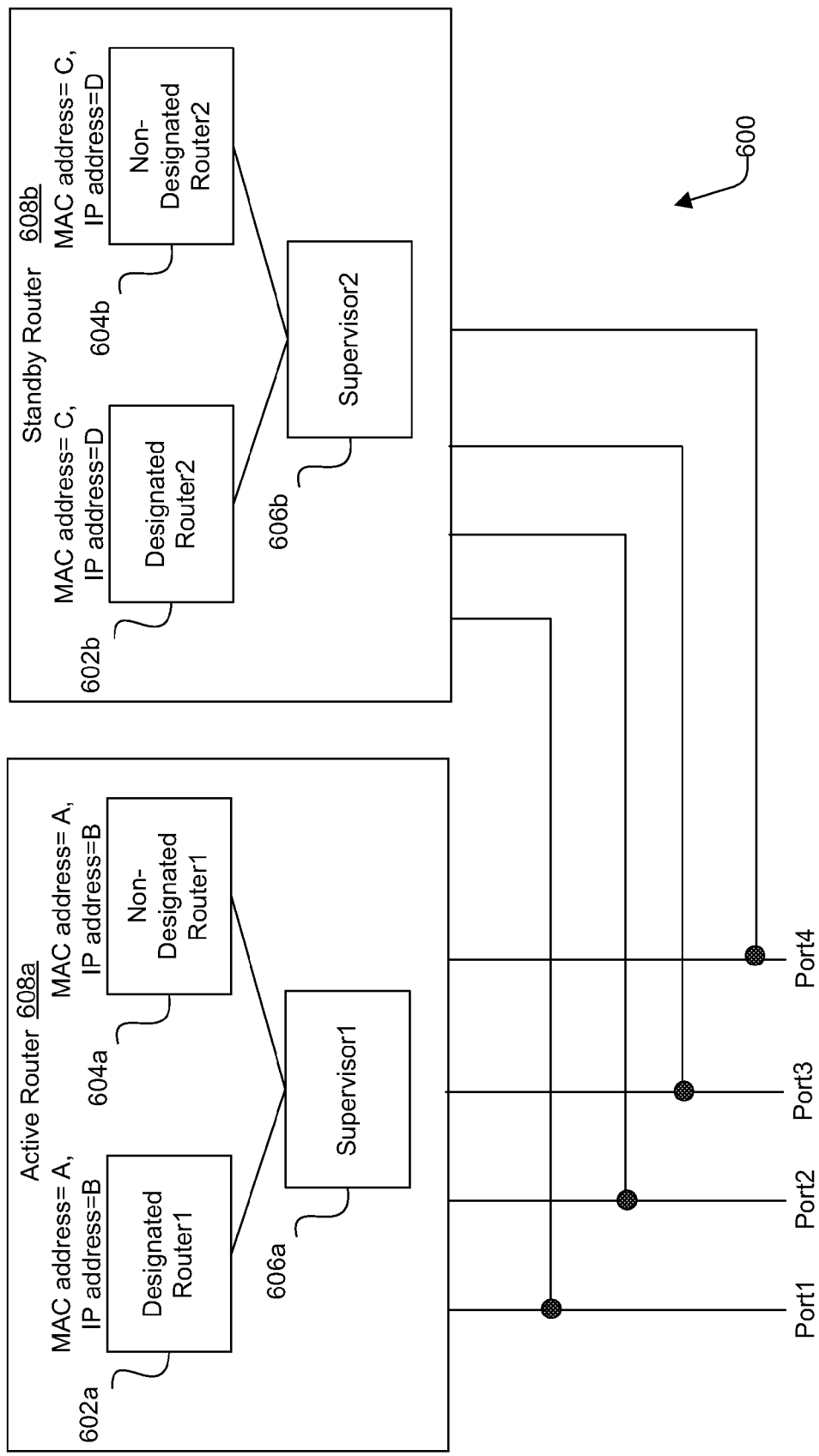
FIG. 6 is a diagrammatic representation of a redundancy router system incorporating the hot standby router protocol (HSRP) in accordance with an alternative embodiment of the present invention.

FIG. 6 is a diagrammatic representation of a redundancy router system incorporating the hot standby router protocol (HSRP) in accordance with an alternative embodiment of the present invention. As shown, a first network device 608*a* is configured with a designated router 602*a* and a non-designated router 604*a*. Each of the routers of the network device 608*a* have the same MAC and IP interface addresses. Likewise, a second network device 608*b* includes a designated router 602*b* and a non-designated router 604*b*, where each router has the same MAC and IP interface addresses. Each network device 608 may also be configured to implement the techniques of hot standby router protocol (HSRP). A more detailed discussion of the mechanisms and techniques of an HSRP type of system can be found in the above referenced '599 patent and the RFC 2281 document, which are incorporated herein by reference in its entirety for all purposes.

In one implementation, the first network device 608*a* may be configured as an active router, and the second network device 608*b* may be configured as a standby router. When the designated router 602*a* fails within the active router 608*a*, the non-designated router 604*a* may take over the forwarding functions for Ports 1 through 4. However, if both routers fail within the active router 608*a*, the standby router 608*b* may take over. That is, the designated router 602*b* of the standby router 608*b* now takes over the forwarding functions of Ports 1 through 4. In other words, the standby router 608*b* replaces the previous active router 608*a* and becomes the active router. This configuration provides four redundant routers without four routers being seen by the network. The network only sees two routers since there are only two pairs of MAC and IP addresses for each router interface. Thus, the complexity of this redundancy system is decreased by a factor of two, as compared to convention HSRP systems that use four routers.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A network system operable to forward data within a computer network, the network system comprising:
   a first router having a plurality of first virtual interfaces configurable to each correspond to one or more physical ports of the network system, the first router being configured to enable the first virtual interfaces when the first router is assigned to be a designated router and to disable the first virtual interfaces when the first router is not assigned to be a designated router, wherein the first virtual interfaces are each configurable to correspond to different sets of one or more physical ports during different time periods;
   a second router having a plurality of second virtual interfaces configurable to correspond selectively to one or more physical ports of the network system, the second router being configured to enable the second virtual interfaces when the second router is assigned to be a designated router and to disable the second virtual interfaces when the second router is not assigned to be a designated router, wherein the second virtual interfaces are each configurable to correspond to different sets of one or more physical ports during different time periods; and
   a supervisor module configured to assign a selected one of the first and second routers to be a designated router,
   wherein each first virtual interface of the first router has a same internet protocol (IP) address and media access control (MAC) address as a corresponding one of the second virtual interfaces of the second router.

2. A network system as recited in claim 1, wherein
   the first router is further configured to inform the second router about any change in a configuration of its first virtual interfaces when it is assigned as the designated router and to change the configuration of its first virtual interfaces to correspond to a change in configuration of the second virtual interfaces when it is not assigned as the designated router and the second router informs the first router of such a change in the configuration of the first virtual interfaces so that the first virtual interfaces have a same number and configuration as the second virtual interfaces, and
   the second router is further configured to inform the first router about any change in the configuration of its second virtual interfaces when it is assigned as the designated router and to change the configuration of its second virtual interfaces to correspond to a change in state of the first virtual interfaces when it is not assigned as the designated router and the first router informs the second router of such a change in the configuration of the second virtual interfaces so that the first virtual interfaces have a same number and configuration as the second virtual interfaces as the second virtual interfaces.

3. A network system as recited in claim 2, further comprising a control bus for managing the first and second router and the supervisor module and a data bus through which data is received and transmitted into and out of the physical ports of the network system.

4. A network system as recited in claim 2, wherein the supervisor module is further configured to poll the currently assigned designated router to determine whether the designated router has failed and when the designated router has failed, to assign another of the routers to be a designated router.

5. A network system as recited in claim 2, wherein
   the first router is further configured to enable the first virtual interfaces by setting a link state of each first virtual interface to an up state and to disable the first virtual interfaces by setting a link state associated with each first virtual interface to a down state, and
   the second router is further configured to enable the second virtual interfaces by setting a link state of each second virtual interface to an up state and to disable the second virtual interfaces by setting a link state associated with each second virtual interface to a down state.

6. A network system as recited in claim 5, the first and second virtual interfaces each have an associated administrative state that is operable to be set by a user or the supervisor module to an up or down state to thereby enable or disable, respectively, the each virtual interface, wherein the first and second routers are each configured to maintain the same states for their virtual interface's administrative states as the other router, and wherein each first and second virtual interface are only enabled when its corresponding link state and administrative state both have an up state.

7. A network system as recited in claim 6, wherein
   the first router is further configured to communicate to the second router a change of an administrative state of a selected first virtual interface to a down value when the first router is assigned as the designated router and to change the administrative state of the selected first virtual interface to a down state when the second router communicates that its corresponding second virtual interface's administrative state has been changed to a down state, and
   the second router is further configured to communicate to the first router a change of an administrative state of a selected second virtual interface to a down state when the second router is assigned as the designated router and to change the administrative state of the selected second virtual interface to a down state when the first router communicates that its corresponding first virtual interface's administrative state has been changed to a down state.

8. A network system as recited in claim 5, wherein
   the first router is further configured to enable a selected first virtual interface when a new virtual local area network (VLAN) that corresponds to one or more physical ports and the selected first virtual interface is created in the supervisor module, a link state of the selected first virtual interface being enabled by setting a corresponding link state to up, when the first router is assigned as the designated router, and
   the second router is further configured to enable a selected second virtual interface when a new virtual local area network (VLAN) that corresponds to one or more physical ports and the selected second virtual interface is created in the supervisor module, a link state of the selected second virtual interface being enabled by setting a corresponding link state to up, when the second router is assigned as the designated router.

9. A network system as recited in claim 8, wherein the first router is configured to enable the selected first virtual interface after the first router is informed that the new VLAN has been created and the second router is configured to enable the second virtual interfaces after the second router is informed that the new VLAN has been created.

10. A network system as recited in claim 1, further comprising a plurality of virtual interface modules for interfacing with a plurality of physical ports, wherein the first and second virtual interfaces of the first and second routers, respectively, each correspond to one or more of the physical ports.

11. A network system as recited in claim 1, wherein the supervisor module is configured with a plurality of VLAN's that each correspond to one or more physical ports.

12. A network system as recited in claim 1, wherein the first router and the second router are each configured to provide layer 3 switching when it is assigned as a designated router, and the supervisor module is configured to provide layer 2 switching.

13. A network system as recited in claim 1, wherein the first and second router appear together as a single router to other neighboring routers within the computer network.

14. A network system as recited in claim 1, wherein the supervisor module includes a first slot in which the first router is coupled and a second slot in which the second router is coupled.

15. A router redundancy system comprising:
a first network system as recited in claim 1 configured with a hot standby protocol; and
a second network system as recited in claim 1 configured with the hot standby router protocol,
wherein the first network system is configured to act as one of an active router and a standby router within a hot standby router protocol group and the second network system is configured to act as another one of the active router and the standby router within the hot standby router protocol group.

* * * * *